April 10, 1945.  L. F. TOUHEY  2,373,207
WIND DRIVEN ELECTRIC GENERATOR
Filed July 2, 1943
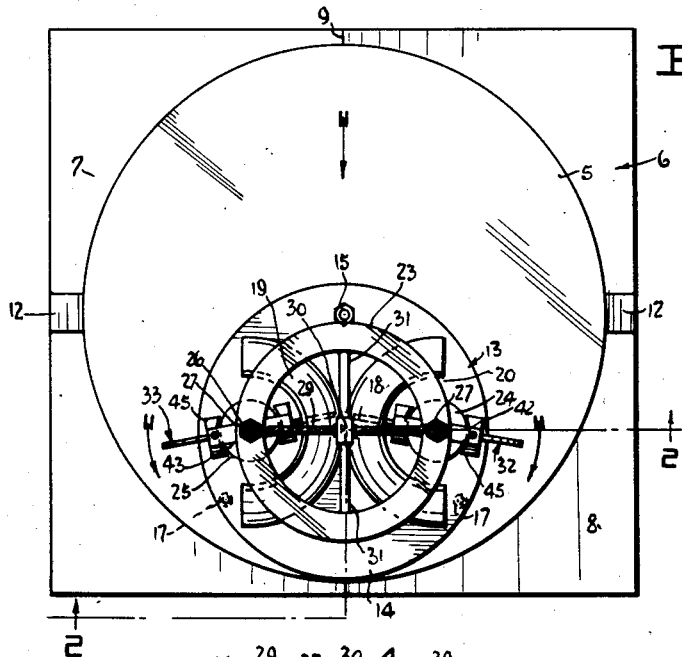
Fig.1.
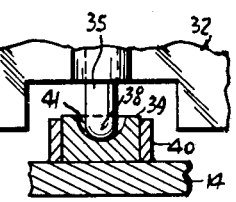
Fig.3.
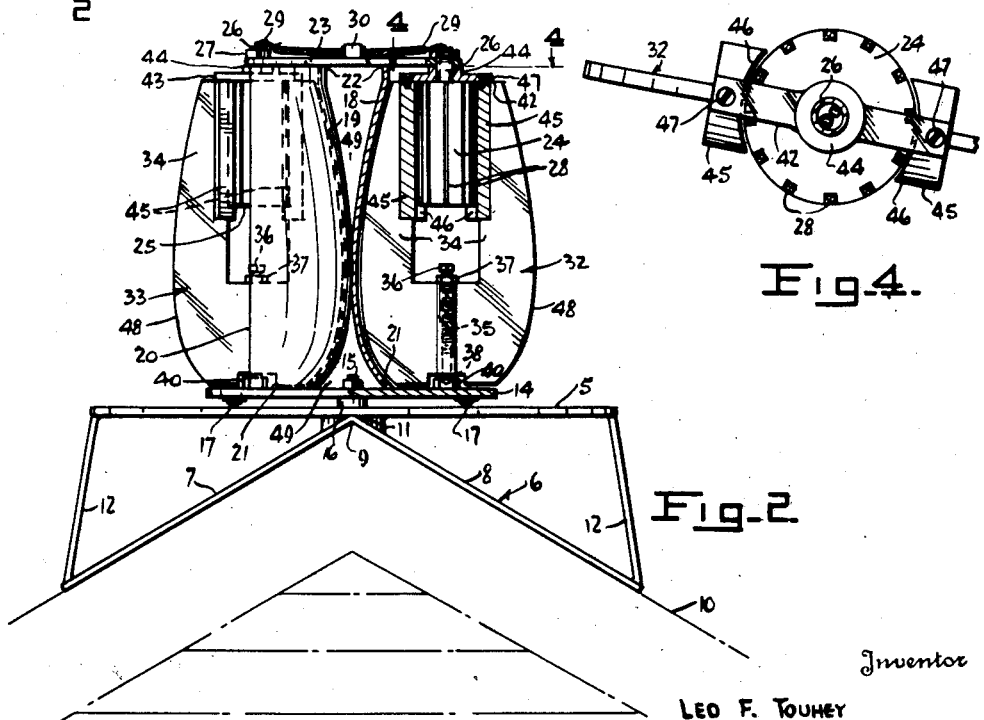
Fig.4.
Fig.2.
Inventor
LEO F. TOUHEY
By Carlsen + Hayle
Attorneys Patented Apr. 10, 1945

2,373,207

UNITED STATES PATENT OFFICE 2,373,207

WIND DRIVEN ELECTRIC GENERATOR

Leo F. Touhey, Minneapolis, Minn.

Application July 2, 1943, Serial No. 493,230

12 Claims. (Cl. 290—44)

This invention relates to improvements in wind driven electric generators.

The primary object of the invention is to provide a structure for this purpose wherein the wind driven element, or elements, forms the field of the generator itself to thus greatly simplify the construction and eliminate the necessity for a propeller or windwheel and associated gearing or connections to the generator field. Another object is to provide a generator of this nature wherein the armature is fixed or non-rotating while the field rotates about the axis thereof, the field in this case taking the form of a flat magnet member adapted to catch the wind and be rotated thereby, when properly shrouded on one side. A further object is to provide a wind driven generator structure of the foregoing characteristics which is exceedingly simple and compact in construction, practical and capable of being easily set up for use, and not likely to get out of adjustment in operation.

These and other more detailed and specific objects will be disclosed in the course of the following specification, reference being had to the accompanying drawing, in which—

Fig. 1 is a top plan view of my generator.

Fig. 2 is a side elevation partially in vertical cross section, taken along the line 2—2 in Fig. 1.

Fig. 3 is an enlarged fragmentary vertical sectional view through the lower bearing for one of the rotor members.

Fig. 4 is an enlarged fragmentary horizontal sectional view along the line 4—4 in Fig. 2.

Referring now more particularly and by reference characters to the drawing, I provide a mounting for the generator comprising a circular platform member 5 which is supported atop a saddle member 6 having downwardly sloping sides 7—8 which are joined at a peak 9 and are sloped to correspond with the pitch of the roof 10 upon which the generator is to be mounted. The saddle may obviously be made to fit any roof and be readily secured thereto by nails, screws or other means, not here shown. The platform 5 is welded, or otherwise secured, at 11 along a diametrical line to the peak 9 of the saddle and is supported at opposite edges by brace arms 12, also welded in place.

Mounted atop the platform 5 is the generator assembly designated generally at 13, comprising a base plate 14, here shown as being a circular disk smaller in diameter than the platform, and pivoted thereto by a vertically disposed bolt or pin 15. This pin 15 is located centrally of the platform but to one side of the base plate 14 so that the latter may swing about through a full circle, parallel with the platform, while remaining disposed thereover. A collar 16 may be provided on the pin 15 to slightly space the base plate 14 above the platform and additional support may be provided by conventional ball bearing members 17 secured to the underside of the base plate to roll around the upper surface of the platform.

The generator, per se, actually as here shown comprises two magneto-electric units which are essentially duplicate in construction. These units comprise shield or shroud members 18—19 which are, in plan or horizontal cross section, substantially semi-circular in shape and are disposed back to back, or with their open sides 20 oppositely faced. At their lower ends 21 the shroud members are welded, or otherwise suitably secured, to the base plate 14 to either side of center thereof and at upper ends 22 the members are similarly fastened to a top ring 23, forming a rigid assembly of these parts.

Depending from the top ring 23, at diametrically opposite points corresponding to the upright centers or axes of the shroud members 18—19, are the two armatures 24 and 25 which at upper ends have tubular supports 26 passed through suitable openings in the ring and provided with nuts 27 at upper ends securing the armatures in place. These armatures are rigid with respect to the assembly as a whole and have cylindrical outer surfaces. The usual windings are placed on the armatures as represented at 28 and the leads 29 therefrom are brought upwardly through the tubular supports 26 and may be connected in a junction box 30, supported from the top ring 23 by arms 31. Suitable wires (not shown) may then be led off from the junction box to deliver the output of the generators. The armatures are preferably insulated electrically from the supports 26 by any suitable means.

The generators are completed by field members, or field producing elements, which are shown as being in the form of inverted U-shaped or horseshoe shaped permanent magnets 32 and 33, the legs or arms 34 of which are so spaced as to clear the armatures. At lower ends the magnets are supported by threaded pivot pins or pintles 35 which are threaded in upright positions down through the centers of the magnets and have heads 36 and set nuts 37 on upper ends, within the space between the legs 35, so that the pintles may be moved up or down with respect to the magnets. The lower rounded ends 38 (Fig. 3) of the pintles are rotatably seated in bearings 39 which are non-rotatably received in hexagonal retaining cups 40 secured to the upper surface of the base plate 14 for this purpose. These bearings 39 may have their recesses 41, in which the pintle ends 38 seat, filled with oil for lubricating purposes.

The upper ends of the legs or the magnets 32 and 33 are joined by cross members, or cross bars, 42 and 43 which at their centers have bearings 44 by which they are freely journaled upon the tubular supports 26 of the armatures 24 and 25 above the upper ends of the armatures. These cross bars 42 and 43 are of non-ferrous or non-magnetic material so that they do not act as keepers, or magnetically connect the ends of the magnets.

Pole pieces 45 are placed in recesses formed in the inner, upper portion of each magnet leg 34 and are formed of soft iron or similar material ordinarily used for the purpose. These pole pieces are considerably wider, or much thicker than the magnets themselves and have arcuate inner faces 46 which conform to and nicely fit the curvature of the armatures 24 and 25. The pole pieces are welded or otherwise fastened to the magnets and serve, as here shown, as convenient supports for the cross bars 42 and 43, which are secured thereto by the screws 47.

As clearly shown the magnets 32 and 33 are so supported that they may turn freely on the vertical axes provided by the pintles 35 and bearings 44, and the shroud members 18 and 19 will enclose one side of the circular path of each magnet. The two sides of each magnet will thus move in succession clear of the shroud members and in operation these sides of the magnets will catch the wind and thereby cause the magnets to rotate in opposite directions, as shown by the arrows in Fig. 1. This rotation of the magnets carries the pole pieces 45 around the armatures 24—25 and the magnetic fields thus set up will generate electric currents in the armature windings which are led off through the leads 29. The width or thickness of the pole pieces intensifies the magnetic field while permitting the use of comparatively thin material for the magnets themselves, thus reducing inertia and permitting the magnets to turn freely in the wind. The magnets and associated pole pieces thus act as, and form or produce, the fields required for the magneto-electric generation of the electrical currents. Since these magnets themselves rotate in the wind no coupling gears or shafts are required to complicate the construction.

The magnets are here shown as having their lateral margins arcuate, as represented at 48, so that the magnets are substantially ovate in shape with their upper and lower ends narrower than their central portions. The shroud members 18 and 19 are shaped to correspond, being rounded or curved in the vertical plane as shown in Fig. 2. This shape of the parts serves two useful purposes in that, first, it spaces the respective ends of the magnets 32 and 33 further apart than would be the case were they straight sided and thus reduces interaction between the two magnetic fields involved and, second, it provides spaces 49 between the shroud members 18 and 19 which act to relieve the structure of excessive strain when the velocity of the wind is high.

However, the entire structure has sufficient surface exposed to the wind so that as the wind direction changes the entire generator assembly 13 will swing about on the pivot 15 to properly bring the magnets into the wind. The direction of the wind for the position of the parts as shown, is indicated by the upper arrow in Fig. 1.

It is apparent that I may provide, in lieu of the permanent magnets 32 and 33, similarly shaped members having wire wound field coils to set up the required magnetic fields, and in such use suitable collector brushes would be employed to make contact with these coils.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A wind powered magneto-electric generator of the character described, comprising an armature support, an armature rigidly carried by said support, and a field producing element rotatably mounted to turn about the armature, the said element being generally flat and adapted itself to catch the wind and cause its rotation thereby.

2. A wind driven magneto-electric apparatus of the character described, comprising an armature member, means non-rotatably supporting the armature member, a field producing member rotatably supported adjacent the armature member, the said field producing member comprising a permanent magnet having pole portions for rotation about the armature member to induce electro-magnetic field therein, and said field producing member having side portions shaped and adapted to catch the wind for rotation thereby.

3. In an apparatus of the character described, a pair of armatures, a frame structure non-rotatably supporting the armatures in spaced relation and in upright positions, a permanent magnet rotatably supported for movement around each armature about an upright axis, each of said magnets having pole portions adapted to rotate around the armature to set up magnetic fields therein, and shroud members enclosing substantially half the rotary path of the magnets and exposing them during the remainder of their travel whereby they may be engaged and rotated by the wind.

4. In an apparatus of the character described, a pair of armatures, a frame structure non-rotatably supporting the armatures in spaced relation and in upright positions, a substantially U-shaped permanent magnet rotatably supported for movement around each armature about an upright axis, each of said magnets having pole portions adapted to rotate around the armature to set up magnetic fields therein, the said magnets having side portions adapted to catch the wind and rotate the magnets, and means for shrouding the side portions of the magnets as they travel toward the wind.

5. In an apparatus of the character described, a pair of armatures, a frame structure non-rotatably supporting the armatures in spaced relation and in upright positions, a substantially U-shaped permanent magnet rotatably supported for movement around each armature about an upright axis, each of said magnets having pole portions adapted to rotate around the armature to set up magnetic fields therein, the said magnets having side portions adapted to catch the wind and rotate the magnets, means for shrouding the sides of the magnets as they move toward the wind, the said sides of the magnets being curved so that the upper and lower ends of the magnets are narrower than their central portions, and the shrouding means being also curved in the vertical plane to correspond to the curvature of the magnet sides.

6. In an apparatus of the character described, a pair of armatures, a frame structure non-rotatably supporting the armatures in spaced relation and in upright positions, a substantially U-shaped permanent magnet rotatably supported for movement around each armature about an upright axis, each of said magnets having pole portions adapted to rotate around the armature to set up magnetic fields therein, pole pieces secured to the pole portions of the magnets and having arcuate surfaces disposed adjacent to and partially encircling the armatures, and means for partially shrouding the magnets so that they may be rotated by the wind.

7. In an apparatus of the character described, a pair of armatures, means supporting the same in upright positions and in spaced relation, a field member for each armature, said field members each comprising a permanent magnet having spaced legs embracing the armature and supported for rotary movement about an upright axis corresponding with the axis of the armature, said magnets having sides to catch the wind for rotation thereby, means for shrouding the sides of the magnets as they move toward the wind, and the rotatable support for each magnet including a vertically adjustable pintle depending from the lower end of the magnet, a bearing for engaging the lower end of the pintle, and a bearing cup for supporting the bearing, the said bearing being removable from the cup for replacement.

8. In an apparatus of the character described, a pair of armatures, means supporting the same in upright positions and in spaced relation, a field member for each armature, said field members each comprising a permanent magnet having spaced legs embracing the armature and supported for rotary movement about an upright axis corresponding with the axis of the armature, said magnets having sides to catch the wind for rotation thereby, means for shrouding the sides of the magnets as they move toward the wind, and the rotatable supports for the magnets including upper bearing members of non-magnetic material joining the legs of the magnets and rotatably embracing a part of the armatures.

9. In an apparatus of the character described, a pair of armatures, means supporting the same in upright positions and in spaced relation, a field member for each armature, said field members each comprising a permanent magnet having spaced legs embracing the armature and supported for rotary movement about an upright axis corresponding with the axis of the armature, said magnets having sides to catch the wind for rotation thereby, means for shrouding the sides of the magnets as they move toward the wind, and a saddle member for supporting the assembly including downwardly sloping side portions for engaging a roof peak.

10. In an apparatus of the character described, a pair of armatures, means supporting the same in upright positions and in spaced relation, a field member for each armature, said field members each comprising a permanent magnet having spaced legs embracing the armature and supported for rotary movement about an upright axis corresponding with the axis of the armature, said magnets having sides to catch the wind for rotation thereby, means for shrouding the sides of the magnets as they move toward the wind, a frame structure for supporting the armatures and magnets, the said frame structure including a base plate to which the armatures and magnets are connected, a platform plate, and said base plate being operatively supported on the platform plate for movement thereabout as the wind direction changes to bring the magnets into the wind.

11. A wind powered generating apparatus of the character described, comprising an armature member, a field member supported for rotation with respect to said armature member, and the said field member having lateral surfaces adapted to catch the wind to rotate the field member about the armature member.

12. A wind powered electric generating apparatus comprising an armature, a field producing member supported for rotation about the armature, and the said field producing member being generally U-shaped in form and having integral portions operative to catch the wind and cause the member to rotate.

LEO F. TOUHEY.